US012782885B2

(12) United States Patent
Okuda

(10) Patent No.: US 12,782,885 B2
(45) Date of Patent: Nov. 3, 2026

(54) PLANT CONTROL PROTECTION DEVICE

(71) Applicant: Mitsubishi Electric Corporation, Tokyo (JP)

(72) Inventor: Susumu Okuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 245 days.

(21) Appl. No.: 18/840,552

(22) PCT Filed: Apr. 18, 2022

(86) PCT No.: PCT/JP2022/018001
§ 371 (c)(1),
(2) Date: Aug. 22, 2024

(87) PCT Pub. No.: WO2023/203594
PCT Pub. Date: Oct. 26, 2023

(65) Prior Publication Data
US 2025/0157683 A1 May 15, 2025

(51) Int. Cl.
*G05B 9/02* (2006.01)
*G21D 3/04* (2006.01)

(52) U.S. Cl.
CPC *G05B 9/02* (2013.01); *G21D 3/04* (2013.01)

(58) Field of Classification Search
CPC .................................... G05B 9/02; G21D 3/04
See application file for complete search history.

(56) References Cited

U.S. PATENT DOCUMENTS

2007/0185700 A1* 8/2007 Izumi ........................ G21D 3/04 703/14
2012/0323341 A1* 12/2012 Hayashi ................... G05B 9/02 700/1

(Continued)

FOREIGN PATENT DOCUMENTS

JP H07319501 A 12/1995
JP 5660833 B2 12/2014

OTHER PUBLICATIONS

Yun Goo Kim, "Apparatus and Method for Controling of Safety System Equipment Using Logic Gate Component in Nuclear Power Plant" (ip.com machine translation of KR 10-1710683 B1), Feb. 27, 2017, ip.com machine translation (Year: 2017).*

(Continued)

*Primary Examiner* — Christopher W Carter
(74) *Attorney, Agent, or Firm* — Buchanan Ingersoll & Rooney PC

(57) ABSTRACT

This plant control protection device includes: monitoring operation circuitry to perform monitoring operation for keeping a plant component in a normal state; and a protection control circuitry which performs process control by transmitting an automatic control signal to the plant component in accordance with the state of the plant component. The monitoring operation circuitry includes a manual transmission circuitry for manually transmitting a manual block signal when an unexpected event has occurred. The protection control circuitry includes a control logic circuitry, and in a case where the manual block signal is inputted to the control logic circuitry in a state in which the automatic control signal is inputted to the control logic circuitry, the control logic, circuitry blocks the automatic control signal from being outputted to the plant component.

3 Claims, 7 Drawing Sheets

3

(56) References Cited

U.S. PATENT DOCUMENTS

| | | | | |
|---|---|---|---|---|
| 2013/0163709 | A1* | 6/2013 | Fujimoto | G21D 3/04<br>376/217 |
| 2016/0284429 | A1* | 9/2016 | Remley | G21C 7/36 |

OTHER PUBLICATIONS

International Search Report (PCT/ISA/210) with translation and Written Opinion (PCT/ISA/237) mailed on Jun. 28, 2022, by the Japanese Patent Office as the International Searching Authority for International Application No. PCT/JP2022/018001. (9 pages).

Thomas, K., et al., "Fully-Integrated Control Room Modernization: A Case Study", Idaho National Laboratory, Idaho Falls, Idaho, Sep. 2016. (187 pages).

Office Action dated Jan. 6, 2026, issued in the corresponding Canadian Patent Application No. 3,255,158, 5 pages.

* cited by examiner

PLANT CONTROL PROTECTION DEVICE

TECHNICAL FIELD

The present disclosure relates to a plant control protection device.

BACKGROUND ART

A plant component such as a valve or a pump for controlling a nuclear power plant as an example of a plant is not only controlled by a manual control signal based on a manual operation by an operator but also can operate under automatic control while a control device monitoring the state of the plant component generates and outputs an automatic control signal based on a predetermined control logic.

In this case, since device control can be performed by both of the manual control signal and the automatic control signal, it is necessary to make designing about which signal is to be preferentially outputted to the device when the manual control signal and the automatic control signal contradict each other.

In a conventional technology, it is disclosed that, when abnormality has occurred in a nuclear power plant, an automatic control signal is always prioritized over a manual control signal, for the plant component, whereby a nuclear power plant is safely stopped (see, for example, Patent Document 1).

That is, in the above conventional technology, in a case where a control device is transmitting neither of automatic operation signals of ON and OFF to the plant component, the plant component can be operated by a manual operation signal.

On the other hand, in a case where an automatic operation signal of OFF is being transmitted to the plant component, even if a manual operation signal of ON is transmitted at the same time, the control device outputs an OFF signal to the plant component. Similarly, in a case where an automatic operation signal of ON is being transmitted to the plant component, even if a manual operation signal of OFF is transmitted at the same time, the control device outputs an ON signal to the plant component.

In this way, in the conventional system, the automatic control signal is prioritized over the manual control signal, thus avoiding a situation in which safety protection operation and control operation designed and verified in advance are hampered by an erroneous signal due to failure of an operation terminal or the like.

CITATION LIST

Patent Document

Patent Document 1: Japanese Patent No. 5660833

SUMMARY OF THE INVENTION

Problem to be Solved by the Invention

A control logic for a plant, especially a nuclear power plant, is required to ensure extremely high reliability, and therefore it is important to design functions while assuming various events.

In the above conventional technology, in a case where the plant falls into a state that was not assumed in function designing of the system, an operator attempts to operate the plant component so as to adapt to the situation but the automatic control signal is always prioritized and thus it is assumed that an intended device operation cannot be performed.

For example, in accordance with an inputted plant monitoring signal and an installed control logic, the control device transmits an actuation signal for a pump as an example of a plant component, to actuate the pump. Then, an event that was not assumed in plant designing occurs during the operation, and therefore the actuated pump needs to be stopped. However, the control device continues outputting an automatic control signal for the pump in accordance with the control logic. Therefore, even if an operator transmits a manual control signal, the automatic control signal is prioritized, so that the pump cannot be stopped.

The present disclosure has been made to solve the above problem, and an object of the present disclosure is to provide a plant control protection device configured such that, while an automatic control signal is prioritized in a normal case, if an unexpected event has occurred, an automatic control signal is invalidated by a manual operation, thus improving reliability of plant operation.

Means to Solve the Problem

A plant control protection device according to the present disclosure includes; monitoring operation equipment for performing monitoring operation to keep a plant component in a normal state; and a protection control device which performs state detection for the plant component and performs process control by transmitting an automatic control signal to the plant component in accordance with a detected state of the plant component. The monitoring operation equipment includes a manual transmission unit for transmitting a manual block signal to manually block the automatic control signal from being outputted to the plant component when an unexpected event has occurred. The protection control device includes a control logic unit, and in a case where the manual block signal is inputted to the control logic unit in a state in which the automatic control signal is inputted to the control logic unit, the control logic unit blocks the automatic control signal from being outputted to the plant component.

Effect of the Invention

With the plant control protection device according to the present disclosure, while the automatic control signal generated by the control device is prioritized in a normal case, if an event that was not assumed in the original designing has occurred, the manual block signal is transmitted in accordance with determination by an operator, whereby the automatic control signal can be invalidated. Thus, it becomes possible to flexibly deal with the situation, whereby reliability of plant operation is further improved.

DESCRIPTION OF EMBODIMENTS

Embodiment 1

Figure 1:
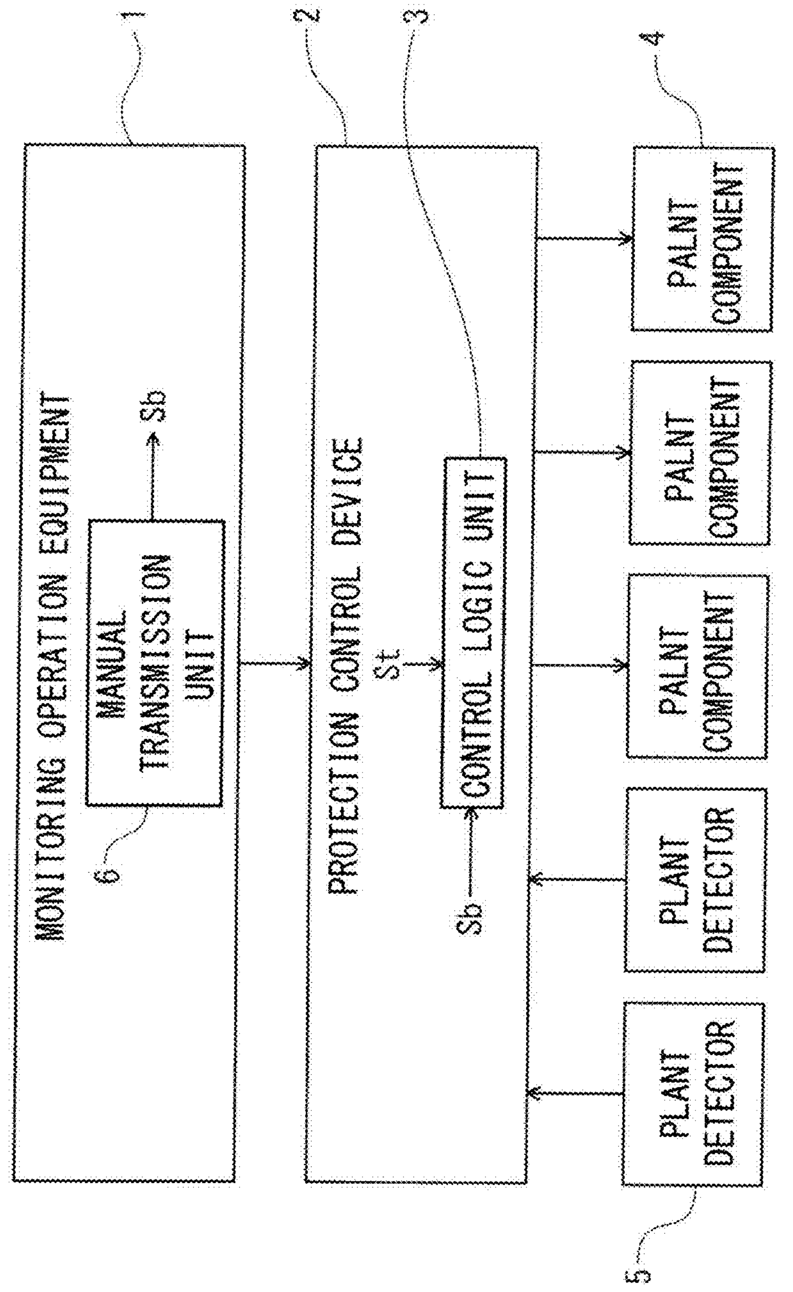
FIG. 1 is a block diagram showing a schematic configuration of the entirety of a plant control protection device according to embodiment 1.

FIG. 1 is a block diagram showing a schematic configuration of the entirety of a plant control protection device according to embodiment 1 of the present disclosure.

The plant control protection device of embodiment 1 includes monitoring operation equipment 1 and a protection control device 2.

The monitoring operation equipment 1 is for performing monitoring operation to keep various plant components 4 in normal states. The monitoring operation equipment 1 includes a manual transmission unit 6 for, in a case where an unexpected event has occurred, transmitting a manual block signal Sb to manually block a below-described automatic control signal transmitted from the protection control device 2 from being outputted to the plant component 4.

The protection control device 2 performs process control by transmitting an automatic control signal to the plant component 4 in accordance with the state of the plant component 4 detected by each plant detector 5. In the present embodiment 1, the automatic control signal is an automatic start signal St to automatically turn on the plant component 4. The protection control device 2 includes a control logic unit 3.

Figure 2:
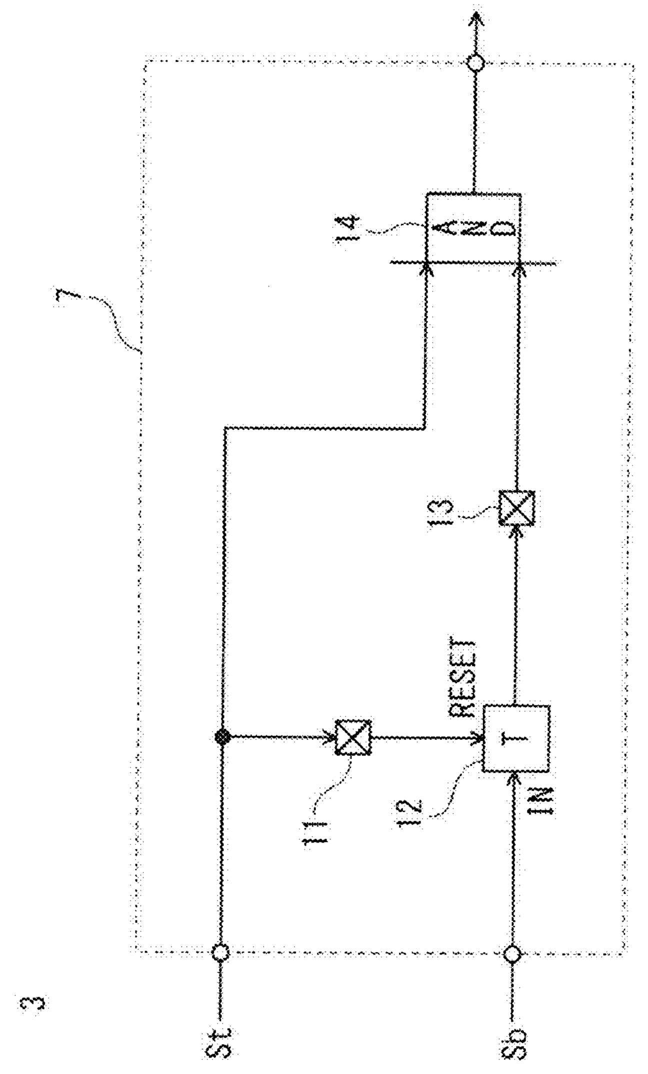
FIG. 2 is a specific circuit diagram of a control logic unit included in the plant control protection device according to embodiment 1.

FIG. 2 is a specific circuit diagram of the control logic unit 3 included in the protection control device 2.

To the control logic unit 3, the automatic start signal St and the manual block signal Sb are inputted. The control logic unit 3 includes a logic circuit 7 composed of a T flip-flop circuit (hereinafter, referred to as TFF circuit) 12 to which a signal obtained by the automatic start signal St passing through a first NOT circuit 11 is inputted as a reset signal and the manual block signal Sb is inputted as a trigger signal for level inversion, and an AND circuit 14 which receives the automatic start signal St as one input and receives an output obtained through a second NOT circuit 13 from the TFF circuit 12, as another input.

Figure 3:
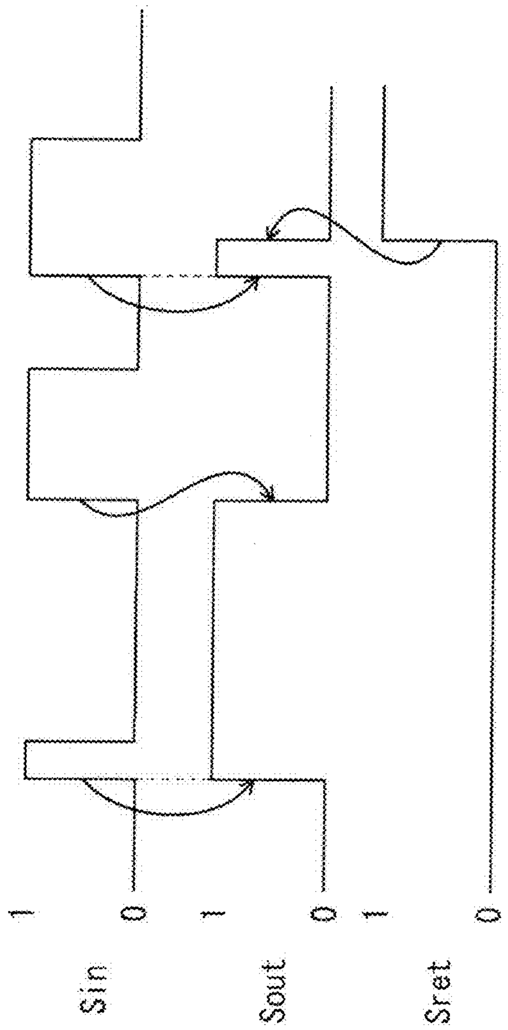
FIG. 3 is a timing chart for explaining operation of a TFF circuit included in a logic circuit shown in FIG. 2.

FIG. 3 is a timing chart for explaining operation of the TFF circuit 12 composing the logic circuit 7 shown in FIG. 2.

As generally known, the TFF circuit 12 has a function of outputting one output signal Sout in response to two signal inputs of a reset signal Sret and an input signal Sin serving as a trigger signal for level inversion. In a case where the reset signal Sret is OFF, the output signal Sout undergoes level inversion every time the input signal Sin changes from OFF to ON. In a case where the reset signal Sret is ON, the output signal Sout becomes OFF irrespective of the state of the input signal Sin.

In the present embodiment 1, the reset signal Sret of the TFF circuit 12 is a signal obtained by the automatic start signal St undergoing level inversion through the first NOT circuit 11, and the input signal Sin serving as a trigger signal for level inversion is the manual block signal Sb.

Next, operation of the plant control protection device having the above configuration will be described.

With the monitoring operation equipment 1, monitoring operation is performed for the plant components 4 such as a valve and a pump for controlling process values such as a flow rate, a water level, and a pressure in the plant.

In a case where an event that was not assumed in plant designing has occurred, an operator manually operates the manual transmission unit 6 provided in the monitoring operation equipment 1, to transmit the manual block signal Sb to manually block the automatic control signal (here, automatic start signal St) transmitted from the protection control device 2 from being outputted to the plant component 4. The manual block signal Sb is sent to the protection control device 2.

In a case where, on the basis of a signal from the plant detector 5 for detecting the process value of each plant component 4, the protection control device 2 determines that a condition for operating the plant component 4 is satisfied, the protection control device 2 transmits an automatic control signal (here, automatic start signal St) for the plant component 4. The transmitted automatic start signal St is inputted to the control logic unit 3. In a case where the manual block signal Sb is transmitted from the manual transmission unit 6 of the monitoring operation equipment 1, the manual block signal Sb is also inputted to the control logic unit 3.

Figure 4:
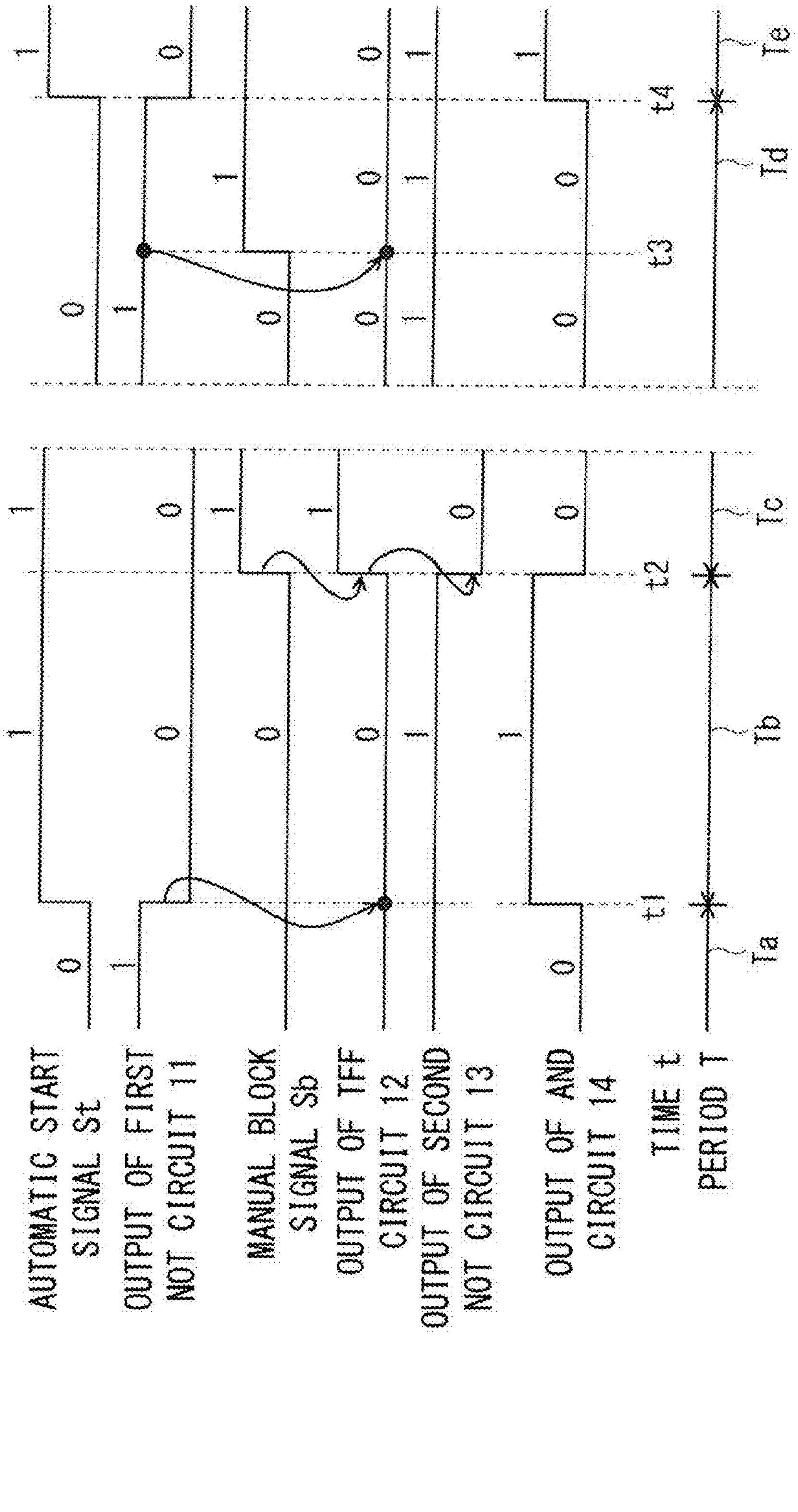
FIG. 4 is a timing chart for explaining operations at respective parts of the logic circuit composing the control logic unit shown in FIG. 2.

FIG. 4 is a timing chart for explaining operations at respective parts of the logic circuit composing the control logic unit shown in FIG. 2.

In a case where neither the automatic start signal St nor the manual block signal Sb is being transmitted, since the automatic start signal St is OFF, the output of the first NOT circuit 11 is ON, so that the TFF circuit 12 is reset and the output of the TFF circuit 12 is OFF. Accordingly, the output signal from the second NOT circuit 13 to which the output signal from the TFF circuit 12 is inputted becomes ON and is inputted to the other input terminal of the AND circuit 14. Thus, the gate of the AND circuit 14 is opened. At this time, since the automatic start signal St is not transmitted, the output of the AND circuit 14 remains OFF (a period Ta until time t1 in FIG. 4).

In a case where the protection control device 2 determines that the condition for operating the plant component 4 is satisfied, the protection control device 2 transmits the automatic start signal St for the plant component 4 (time t1 in FIG. 4). The automatic start signal St is inputted to the one input terminal of the AND circuit 14 of the logic circuit 7, and also undergoes level inversion through the first NOT circuit 11, so that the output of the first NOT circuit 11 becomes OFF. Thus, the TFF circuit 12 is not reset and the output of the TFF circuit 12 remains OFF.

At this time, if the manual block signal Sb is not inputted from the manual transmission unit 6 of the monitoring operation equipment 1 to the logic circuit 7, since the output signal from the TFF circuit 12 is OFF as described above, the output signal from the second NOT circuit 13 is ON and this ON signal is inputted to the other input terminal of the AND circuit 14. Thus, the gate of the AND circuit 14 is opened and the automatic start signal St is transmitted to the plant component 4 (a period Tb from time t1 to time t2 in FIG. 4).

As described above, in a case where the manual block signal Sb is not transmitted, the plant component 4 can be operated by the automatic start signal St.

In a state in which the plant component 4 is operated by the automatic start signal St, if an event that was not assumed in plant designing has occurred, an operator manually operates the manual transmission unit 6 of the monitoring operation equipment 1, so that the manual block signal Sb is inputted to the control logic unit 3 (time t2 in FIG. 4). In this case, the input to the TFF circuit 12 changes from OFF to ON by the manual block signal Sb, so that the output of the TFF circuit 102 also becomes ON. At this time, since the automatic start signal St is ON, the output of the first NOT circuit 11 is OFF and the TFF circuit 12 is not reset.

Thus, when the output of the TFF circuit 12 becomes ON, the output signal from the second NOT circuit 13 becomes OFF and this OFF signal is inputted to the other input terminal of the AND circuit 14. As a result, the gate of the AND circuit 14 is closed, whereby the automatic start signal St is blocked from being transmitted to the plant component 4.

As described above, in a case where the manual block signal Sb is transmitted while the plant component 4 is being controlled by the automatic start signal St, even if the automatic start signal St is ON, transmission of the automatic start signal. St to the plant component 4 is blocked by the manual block signal Sb (a period Tc after time t2 in FIG. 4).

In a state in which the automatic start signal St is not transmitted from the protection control device 2, if the manual transmission unit 6 is erroneously manually operated and thus the manual block signal Sb is inputted to the control logic unit 3 (time t3 in FIG. 4), since the automatic start signal St is not transmitted, the output of the first NOT circuit 11 is ON, so that the output of the TFF circuit 12 is reset and is kept being OFF.

Thus, the output signal from the second NOT circuit 13 becomes ON and this ON signal is inputted to the other input terminal of the AND circuit 14, so that the gate of the AND circuit 14 is opened. However, since the automatic start signal St is still not transmitted from the protection control device 2, the output of the AND circuit 14 remains OFF (a period Td until time t4 in FIG. 4).

In this state, next, if the automatic start signal St is transmitted from the protection control device 2 (time t4 in FIG. 4), the automatic start signal St passes through the AND circuit 14 and is transmitted to the plant component 4, as in the above case of time t1. Thus, control operation for the plant component 4 can be performed by the automatic start signal St (a period Te after time t4 in FIG. 4).

As described above, even in a case where the manual block signal Sb is erroneously inputted to the control logic unit 3 through manual operation before transmission of the automatic start signal St, there is not any problem, and subsequently, when the automatic start signal St is transmitted, the automatic start signal St can be transmitted to the plant component 4 without any problem.

As described above, in the present embodiment 1, such a function that transmission of the automatic control signal (here, automatic start signal St) from the protection control device 2 to the plant component 4 is blocked by the manual block signal Sb transmitted through manual operation by an operator, is provided. Therefore, while the automatic start signal St generated by the protection control device 2 is prioritized in a normal case, if an event that was not assumed in the original designing has occurred, the automatic start signal St can be invalidated in accordance with determination by an operator. Thus, it becomes possible to flexibly deal with the situation, whereby reliability of plant operation is further improved.

Embodiment 2

Figure 5:
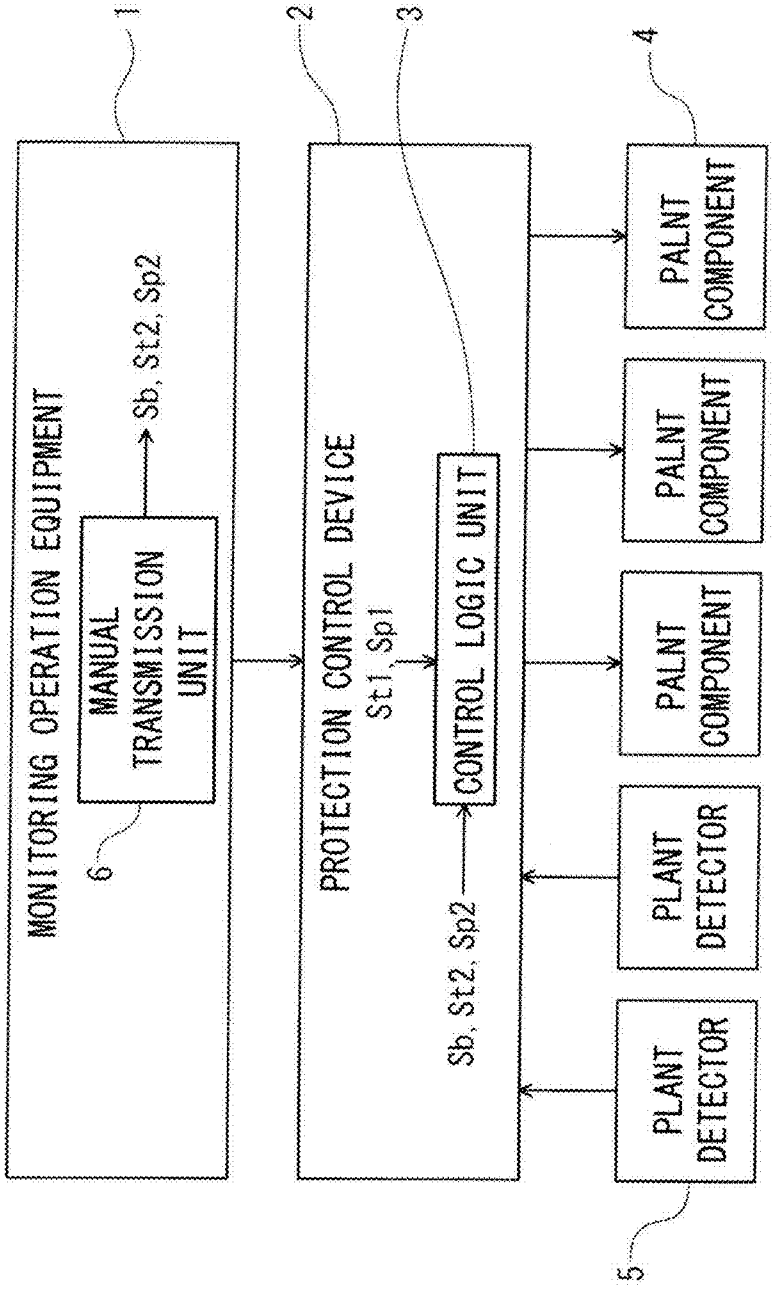
FIG. 5 is a block diagram showing a schematic configuration of the entirety of a plant control protection device according to embodiment 2.
Figure 6:
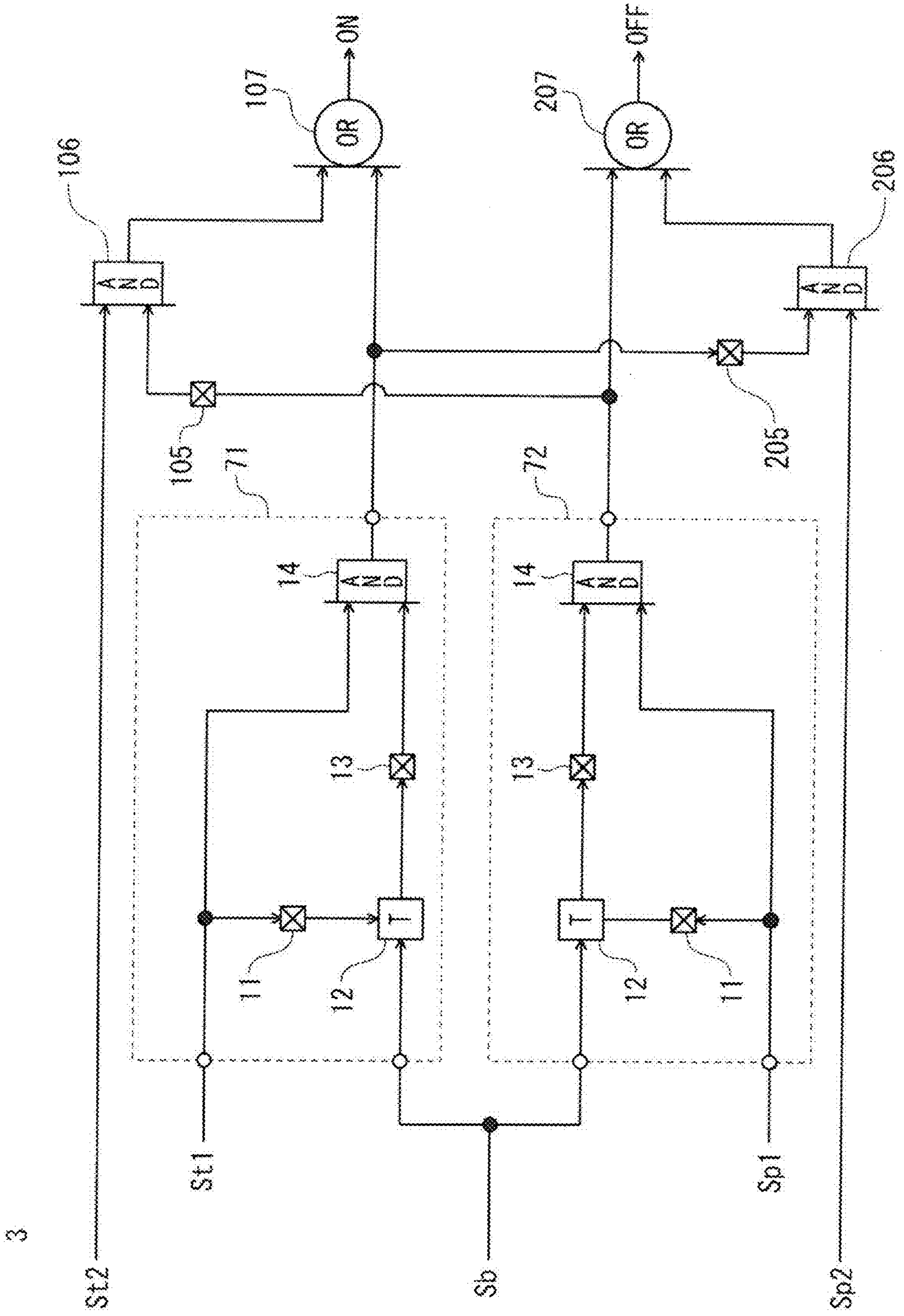
FIG. 6 is a specific circuit diagram of a control logic unit included in the plant control protection device according to embodiment 2.

FIG. 5 is a block diagram showing a schematic configuration of the entirety of a plant control protection device according to embodiment 2, and FIG. 6 is a specific circuit diagram of a control logic unit included in the plant control protection device according to embodiment 2.

In embodiment 1, only the manual block signal Sb is transmitted from the manual transmission unit 6 of the monitoring operation equipment 1. On the other hand, in the present embodiment 2, in addition to the manual block signal Sb, a manual start signal St2 to manually turn on the plant component 4 and a manual stop signal Sp2 to manually turn off the plant component 4 are transmitted from the manual transmission unit 6 of the monitoring operation equipment 1.

In embodiment 1, the protection control device 2 transmits only the automatic start signal St to automatically turn on the plant component 4 in accordance with the state of the plant component 4 detected by each plant detector 5. On the other hand, in the present embodiment 2, as the automatic control signal to be transmitted to the plant component 4, an automatic stop signal Sp1 to automatically turn off the plant component 4 is transmitted in addition to an automatic start signal St1 to automatically turn on the plant component 4.

As shown in FIG. 6, the control logic unit 3 of embodiment 2 includes two logic circuits 71, 72 having the same configuration as the logic circuit 7 shown in embodiment 1 (FIG. 2). Here, for convenience sake, one logic circuit 71 is referred to as a first logic circuit, and the other logic circuit 72 is referred to as a second logic circuit.

To the first logic circuit 71, the automatic start signal St1 and the manual block signal Sb are inputted, and to the second logic circuit 72, the automatic stop signal Sp1 and the manual block signal Sb are inputted.

Further, the control logic unit 3 of embodiment 2 includes a third NOT circuit 105, a fourth NOT circuit 205, a first AND circuit 106, a second AND circuit 206, a first OR circuit 107, and a second OR circuit 207.

In this case, the first AND circuit 106 receives an output obtained through the third NOT circuit 105 from the second logic circuit 72, as one input, and receives the manual start signal St2 as another input. The second AND circuit 206 receives an output obtained through the fourth NOT circuit 205 from the first logic circuit 71, as one input, and receives the manual stop signal Sp2 as another input. The first OR circuit 107 receives an output from the first logic circuit 71 as one input and receives an output from the first AND circuit 106 as another input. The second OR circuit 207 receives an output from the second logic circuit 72 as one input and receives an output from the second AND circuit 206 as another input.

Next, operation of the control logic unit 3 having the above configuration will be described.

The basic operations of the first logic circuit 71 and the second logic circuit 72 are the same as that in embodiment 1. The detailed description of operations of the first logic circuit 71 and the second logic circuit 72 is omitted.

First, in a case where neither the automatic start signal St1 nor the manual block signal Sb is being transmitted, the output of the AND circuit 14 of the first logic circuit 71 is OFF, so that the output signal from the fourth NOT circuit 205 becomes ON and the gate of the second AND circuit 206 is opened. Thus, through the second OR circuit 207, stop operation for the plant component 4 can be performed by the manual stop signal Sp2.

Similarly, in a case where neither the automatic stop signal Sp1 nor the manual block signal Sb is being transmitted, the output of the AND circuit 14 of the second logic circuit 72 is OFF, so that the output signal from the third NOT circuit 105 becomes ON and the gate of the first AND circuit 106 is opened. Thus, through the first OR circuit 107, start operation for the plant component 4 can be performed by the manual start signal St2.

On the other hand, in a case where the automatic start signal St1 is being transmitted, if the manual block signal Sb is still not transmitted, the output of the AND circuit 14 of the first logic circuit 71 becomes ON, so that the automatic start signal St1 is outputted to the plant component 4 through the first OR circuit 107. In addition, when the output of the AND circuit 14 of the first logic circuit 71 becomes ON, the output of the fourth NOT circuit 205 becomes OFF and the gate of the second AND circuit 206 is closed. Therefore, the manual stop signal Sp2 cannot be outputted to the plant component 4.

Similarly, in a case where the automatic stop signal Sp1 is being transmitted, if the manual block signal Sb is still not transmitted, the output of the AND circuit 14 of the second logic circuit 72 becomes ON, so that the automatic stop signal Sp1 is outputted to the plant component 4 through the second OR circuit 207. In addition, when the output of the AND circuit 14 of the second logic circuit 72 becomes ON, the output of the third NOT circuit 105 becomes OFF and the gate of the first AND circuit 106 is closed. Therefore, the manual start signal St2 cannot be outputted to the plant component 4.

As described above, in a case where the automatic start signal St1 is being transmitted, it is impossible to arbitrarily output the manual stop signal Sp2 to stop the plant component 4, and in a case where the automatic stop signal Sp1 is being transmitted, it is impossible to arbitrarily output the manual start signal St2 to start the plant component 4.

In a state in which the plant component 4 is operated by the automatic start signal St, if an event that was not assumed in plant designing has occurred, an operator manually operates the manual transmission unit 6 of the monitoring operation equipment 1, to transmit the manual block signal Sb. In this case, by the manual block signal Sb, the gate of the AND circuit 14 of the first logic circuit 71 of the control logic unit 3 is closed and output of the automatic start signal St1 is blocked. Then, when the output of the AND circuit 14 of the first logic circuit 71 becomes OFF, the output of the fourth NOT circuit 205 becomes ON and the gate of the second AND circuit 206 is opened. Thus, through the second OR circuit 207, the plant component 4 can be stopped by the manual stop signal Sp2.

That is, after the plant component 4 is started by the automatic start signal St1, the plant component 4 can be manually stopped by transmitting the manual block signal Sb and then transmitting the manual stop signal Sp2.

Similarly, in a state in which the plant component 4 is stopped by the automatic stop signal Sp1, if the manual block signal Sb is inputted to the control logic unit 3, the gate of the AND circuit 14 of the second logic circuit 72 is closed and output of the automatic stop signal Sp1 is blocked. Then, when the output of the AND circuit 14 of the second logic circuit 72 becomes OFF, the output of the third NOT circuit 105 becomes ON and the gate of the first AND circuit 106 is opened. Thus, through the first OR circuit 107, the plant component 4 can be started by the manual start signal St2.

That is, after the plant component 4 is stopped by the automatic stop signal Sp1, the plant component 4 can be manually started by transmitting the manual block signal Sb and then transmitting the manual start signal St2.

As described above, in the present embodiment 2, while the automatic start signal St1 and the automatic stop signal Sp1 generated by the protection control device 2 are prioritized in a normal case, if an event that was not assumed in the original designing has occurred, the plant component 4 can be manually stopped by the manual stop signal Sp2 after the automatic start signal St1 is invalidated by the manual block signal Sb transmitted through manual operation by an operator, or the plant component 4 can be manually started by the manual start signal St2 after the automatic stop signal Sp1 is invalidated by the manual block signal Sb. Thus, even in a case where the automatic start signal St1 and the automatic stop signal Sp1 are transmitted from the protection control device 2, it becomes possible to flexibly deal with the situation, whereby reliability of plant operation is further improved.

In the above embodiments 1 and 2, the control logic unit 3 is formed by hardware having a combination of specific logic circuits as shown in FIG. 2 and FIG. 6, but may be formed by software.

Figure 7:
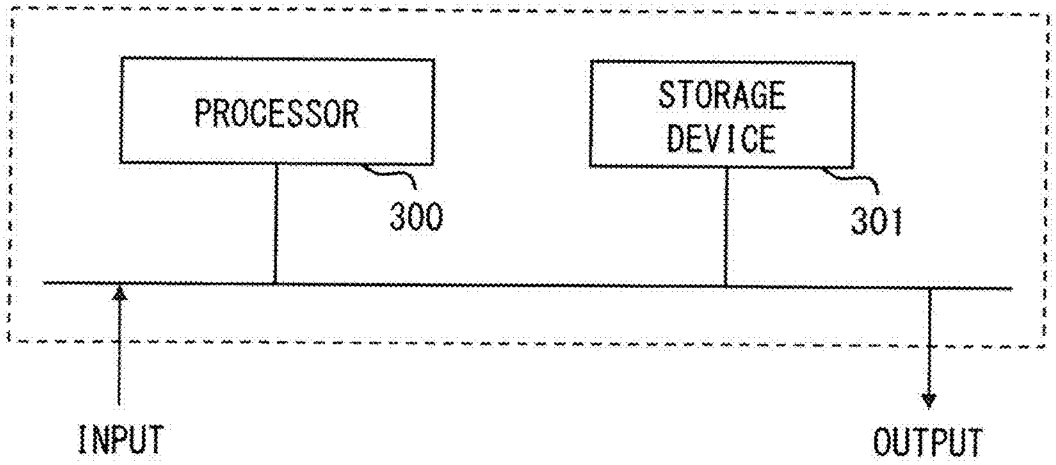
FIG. 7 is a block diagram in a case where the control logic unit is composed of a processor and a storage device.

For example, as shown in FIG. 7, a processor 300 and a storage device 301 may be used, and the processor 300 may execute a program stored in the storage device 301 in advance, to execute the same operation as in the control logic unit 3.

Although not shown, the storage device 301 includes a volatile storage device such as a random access memory and a nonvolatile auxiliary storage device such as a flash memory. The storage device 301 may include an auxiliary storage device of a hard disk, instead of a flash memory. The processor 300 executes a program inputted from the storage device 301. In this case, the program is inputted from the auxiliary storage device to the processor 300 via the volatile storage device. The processor 300 may output data such as a calculation result to the volatile storage device of the storage device 301, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 monitoring operation equipment
2 protection control device 3 control logic unit
4 plant component
5 plant detector
6 manual transmission unit
7 logic circuit
11 first NOT circuit
12 TFF circuit
13 second NOT circuit
14 AND circuit
71 first logic circuit
72 second logic circuit
105 third NOT circuit
106 first AND circuit
107 first OR circuit
205 fourth NOT circuit
206 second AND circuit
207 second OR circuit

The invention claimed is:

1. A plant control protection device comprising: monitoring operation circuitry for performing monitoring operation to keep a plant component in a normal state; and a protection control circuitry which performs state detection for the plant component and performs process control by transmitting an automatic control signal to the plant component in accordance with a detected state of the plant component, wherein the monitoring operation circuitry includes a manual transmission circuitry for transmitting a manual block signal to manually block the automatic control signal from being outputted to the plant component when an unexpected event has occurred, and the protection control device circuitry includes a control logic circuitry, and in a case where the manual block signal is inputted to the control logic circuitry in a state in which the automatic control signal is inputted to the control logic circuitry, the control logic circuitry blocks the automatic control signal from being outputted to the plant component, wherein the control logic circuitry includes a logic circuit composed of a T flip-flop circuit to which a signal obtained by the automatic control signal passing through a first NOT circuit is inputted as a reset signal and the manual block signal is inputted as a trigger signal for level inversion, and an AND circuit which receives the automatic control signal as one input and receives an output obtained through a second NOT circuit from the T flip-flop circuit, as another input.

2. The plant control protection device according to claim 1, wherein the automatic control signal inputted to the logic circuit is an automatic start signal to automatically turn on the plant component.

3. The plant control protection device according to claim 1, wherein the automatic control signal includes an automatic start signal to automatically turn on the plant component and an automatic stop signal to automatically turn off the plant component, the manual transmission circuitry is configured to transmit a manual start signal to manually turn on the plant component and a manual stop signal to manually turn off the plant component, in addition to the manual block signal, the control logic circuitry includes two said logic circuits such that the automatic start signal and the manual block signal are inputted to one of the logic circuits, and the automatic stop signal and the manual block signal are inputted to another of the logic circuits, and the control logic circuitry includes a first AND circuit which receives an output obtained through a third NOT circuit from the other logic circuit, as one input, and receives the manual start signal as another input, a second AND circuit which receives an output obtained through a fourth NOT circuit from the one logic circuit, as one input, and receives the manual stop signal as another input, a first OR circuit which receives an output from the one logic circuit as one input and receives an output from the first AND circuit as another input, and a second OR circuit which receives an output from the other logic circuit as one input and receives an output from the second AND circuit as another input.

* * * * *